(12) United States Patent
Byun et al.

(10) Patent No.: US 7,965,650 B2
(45) Date of Patent: Jun. 21, 2011

(54) METHOD AND SYSTEM FOR QUALITY MONITORING OF MEDIA OVER INTERNET PROTOCOL (MOIP)

(75) Inventors: Joonbum Byun, Gaithersburg, MD (US); Choon B. Shim, Ijamsville, MD (US)

(73) Assignee: Cisco Technology, Inc., San Jose, CA (US)

(*) Notice: Subject to any disclaimer, the term of this patent is extended or adjusted under 35 U.S.C. 154(b) by 653 days.

(21) Appl. No.: 11/436,195

(22) Filed: May 18, 2006

(65) Prior Publication Data

US 2007/0268836 A1 Nov. 22, 2007

(51) Int. Cl.
H04L 12/26 (2006.01)

(52) U.S. Cl. ...................................................... 370/252

(58) Field of Classification Search .................. 370/235, 370/238, 252, 389, 392, 516, 517, 519
See application file for complete search history.

(56) References Cited

U.S. PATENT DOCUMENTS

| | | | | |
|---|---|---|---|---|
| 5,844,600 | A * | 12/1998 | Kerr ........................... | 348/14.12 |
| 6,097,722 | A * | 8/2000 | Graham et al. ........... | 370/395.21 |
| 6,741,569 | B1 * | 5/2004 | Clark ........................... | 370/252 |
| 7,038,710 | B2 * | 5/2006 | Caviedes ..................... | 348/180 |
| 7,680,153 | B2 * | 3/2010 | Ma .............................. | 370/503 |
| 2002/0105909 | A1 * | 8/2002 | Flanagan et al. ............... | 370/230 |
| 2003/0217220 | A1 * | 11/2003 | Lee et al. ........................ | 710/313 |
| 2004/0165570 | A1 * | 8/2004 | Lee ................................. | 370/349 |
| 2007/0047640 | A1 * | 3/2007 | Venna et al. ............. | 375/240.01 |
| 2007/0071030 | A1 * | 3/2007 | Lee ................................. | 370/468 |
| 2007/0177604 | A1 * | 8/2007 | Ozawa et al. ............... | 370/395.2 |

FOREIGN PATENT DOCUMENTS

EP 665693 A2 * 8/1995

OTHER PUBLICATIONS

Kitawaki, N., Arayama, Y., Yamada, T. "Multimedia opinion model based on media interaction of audio-visual communications," Proc. 4th International Conference of MESAQIN 2005, pp. 5-10 (2005).*
Gregory Cermak, "Packet Loss, Bandwidth and Latency Affect Judged Quality of Videoconferencing", at t—Proceedings of the First International Workshop on Video Processing and Quality Metrics for Consumer Electronics—http://vpqm.org/ —VPQM05 Proceedings—Jan. 2005. pages 1-6.*

* cited by examiner

*Primary Examiner* — Thai D Hoang
(74) *Attorney, Agent, or Firm* — Schwegman, Lundberg & Woessner, P.A.

(57) ABSTRACT

In one embodiment, a method includes receiving an internet protocol (IP) packet including encoded media content. A media-quality-value is calculated based on a value of at least one parameter associated with the IP packet and based on a quality equation. The quality equation includes at least one parameter and at least one constant that are defined so that media-quality-values calculated using the quality equation substantially correlate with subjective quality measurements.

29 Claims, 6 Drawing Sheets

US 7,965,650 B2

METHOD AND SYSTEM FOR QUALITY MONITORING OF MEDIA OVER INTERNET PROTOCOL (MOIP)

FIELD OF INVENTION

The present invention relates to media quality monitoring, and in particular, but not by way of limitation, the present invention relates to systems and methods for measuring the quality of media transmitted over an internet protocol data network based on one or more parameter values.

BACKGROUND

The transmission of media (e.g., audio and/or video) over internet protocol (IP) links within an IP data network can result in significant media quality degradation due to the unpredictable nature of IP data networks. The quality of transmitted media can be degraded by many variables related to IP data networks such as the availability of bandwidth, encoding/decoding, network jitter, packet loss, network delay, etc. Degradation of media transmitted over an IP data network can be measured with a high degree of correlation with subjective quality ratings given by humans, but these known methods for doing so can be computationally expensive and/or cannot practically be used in real-time to monitor media quality. Known methods, for example, often require the decoding of encoded media data packets, which can be processor intensive, and often only provide a measure of the total quality of the media (or multi-media) experienced by end users. Measures of the total quality experience have somewhat limited use for network administrators who often want to know how much quality degradation is due to specific network impairments (e.g., just network jitter) over which the network administrator has a degree of control. Other known methods for measuring and/or calculating the quality of media transmitted over an IP data network have little correlation with subjective quality ratings. Thus, a need exists for a computationally efficient method for calculating the subjective quality of a media signal transmitted over an IP data network.

SUMMARY

In one embodiment, a method includes receiving an internet protocol (IP) packet including encoded media content. A media-quality-value is calculated based on a value of at least one parameter associated with the IP packet and based on a quality equation. The quality equation includes at least one parameter and at least one constant that are defined so that media-quality-values calculated using the quality equation substantially correlate with subjective quality measurements.

DETAILED DESCRIPTION

A monitoring device can be configured to calculate a media-quality-value for a combination of media signals, a single media signal, and/or a portion of a media signal being transmitted over an internet protocol (IP) data network via one or more IP packets. The media-quality-value can be an indicator of the degradation of a media signal that has been transmitted over an IP data network. The media-quality-value can be calculated using a quality equation that is based on a parameter (e.g., jitter, packet loss) associated with the IP packet(s). The parameter value(s), which is used in the quality equation, can be obtained by extracting the parameter value(s) directly from and/or calculating the parameter value(s) based on data associated with the IP packet(s).

Parameters and/or constants within the quality equation can be defined so that media-quality-values calculated using the quality equation correlate with known quality metrics (e.g., video quality metrics and/or audio quality metrics). For example, a quality equation that is fitted to a set of Video Quality Metric (VQM) scores derived using specified ranges of one or more parameter values (e.g., specified jitter and/or packet loss values) can be used to calculate a media-quality-value for a video signal. By fitting the quality equation to VQM scores, media-quality-values calculated using parameter values and the quality equation can substantially correlate with VQM scores.

Figure 1:
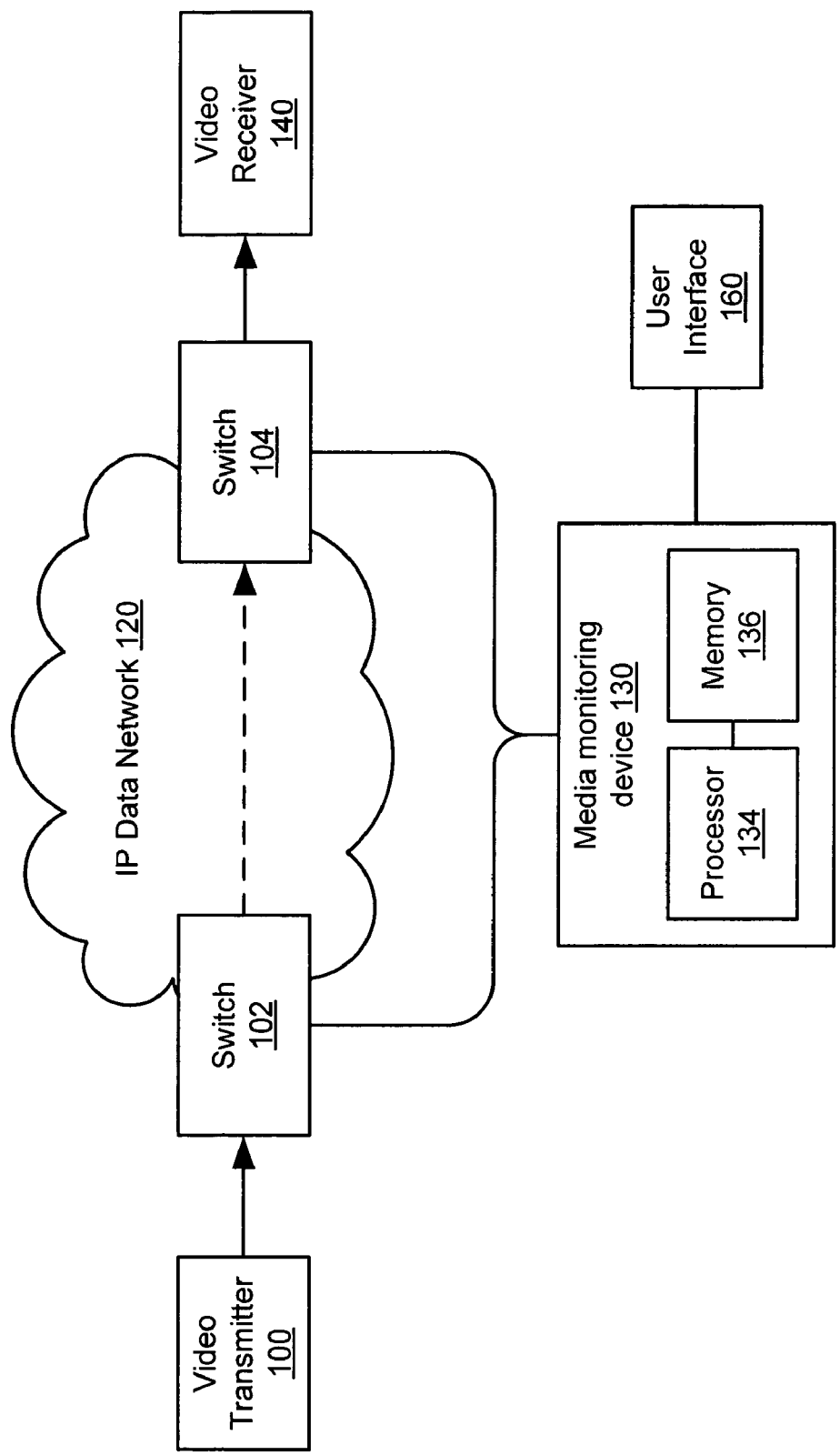
FIG. 1 is a schematic diagram that illustrates a media monitoring device calculating the quality of a media signal transmitted from a media transmitter over an IP data network to a media receiver, according to an embodiment of the invention.

FIG. 1 is a schematic diagram that illustrates a media monitoring device 130 calculating a media-quality-value of a media signal transmitted from a media transmitter 100 over an IP data network 120 to a media receiver 140, according to an embodiment of the invention. The media signal is transmitted over the IP data network 120 via IP packets (also can be referred to as just "packets"). The media monitoring device 130 obtains (e.g., extracts and/or calculates) parameter values associated with the IP packets and uses the parameter values in a quality equation to calculate media-quality-values. The parameters include, for example, jitter, delay (also can be referred to as latency), media codec, available network bandwidth, etc. The media-quality-value can be calculated at substantially the same time (e.g., in real-time) that the media signal is transmitted over the IP data network 120. In some embodiments, real-time transport protocol (RTP) can be used as the transport protocol for transmitting digital media (e.g., video and/or audio) over the IP data network 120.

The quality equation used by the media monitoring device 130 can be fitted to a set of standardized subjective quality scores derived using specified ranges of one or more parameter values (e.g., specified jitter and/or packet loss values). For example, if calculating a media-quality-value for a video signal, a quality equation can be fitted to, for example, VQM scores that correspond to parameter values so that mediaquality-values calculated using the quality equation substantially correlate with VQM scores. A video quality equation fitted to VQM scores allows for the calculation of a subjective measure of video quality that substantially correlates with a VQM score without decoding the contents of an IP packet to actually obtain a VQM score using, for example, a VQM calculation method. A quality equation designed to calculate a media-quality-value for a video signal can be referred to as a video quality equation, likewise, a quality equation related to an audio signal can be referred to as an audio quality equation.

An example of the form of a quality equation that is based on a packet loss parameter is shown in formula 1:

$$\text{VQM score} \approx \text{MQM} = A + B*PL + C*e^{-PL} \qquad (1)$$

where A, B and C are constants, PL is packet loss, and MQM is media-quality-value. The fitting of a video quality equation to a set of VQM scores so that a calculated media-quality-value substantially corresponds to a VQM score for a given parameter value is described in more detail with reference to FIGS. 3-6.

Referring back to the media monitoring device 130 in the embodiment shown in FIG. 1, it includes a processor 134 and a memory 136. The processor 134 obtains one or more parameter values and then uses parameter values in a quality equation to calculate a media-quality-value. Specifically, the processor 134 extracts parameter values directly from (e.g., quality-of-service (QoS) information from an RTP control protocol (RTCP) packet) and/or calculates parameter values based on information associated with packets that are received (i.e., captured) and/or detected by the media monitoring device 130. The media monitoring device 130 receives and/or detects packets via the switches 102 and 104 that serve as access points into the IP data network 120. The processor 134 can, for example, extract a jitter value from a header associated with a packet detected and/or received by the media monitoring device 130. The processor 134 can also calculate, for example, a delay of a packet by determining the time for the packet to travel across the IP data network 120 between switches 102 and 104.

In some embodiments, the processor 134 can calculate a media-quality-value that is associated with a single packet, connection and/or call, portion of a connection and/or call, group of packets, and/or the entire IP data network 120. To calculate a media-quality-value, for example, for a connection, the processor 134 uses parameter value(s) that are associated with the connection. In some embodiments, the parameter value(s) for the single packet, connection and/or call, portion of a connection and/or call, group of packets, and/or entire IP data network 120 can be based on parameter value(s) from a selected group of packets. For example, the processor can calculate the average jitter and delay of a selected group of packets that can then be used as a representative parameter value for a connection and/or call across the IP data network 120. The average jitter and delay values can then be used by the processor 134 to calculate a media-quality-value that corresponds to the connection and/or call.

The memory 136 within the media monitoring device 130 can be any kind of appropriate fixed and/or removable storage device that includes, for example, flash memory and/or a hard disk. The memory 136, in this embodiment, stores the quality equation that is accessed by the processor 134 when making a media-quality-value calculation. The storage of the quality equation includes the storage of parameters and/or constants that are associated with the equation. The processor 134 uses the memory 136 as a buffer and/or as permanent storage, for example, for parameter values and/or information associated with packets that has been extracted and/or calculated. In some embodiments, the memory can be a cache that is embedded in the processor. In some embodiments, the quality equation (s) can be stored in a remote location, such as a control server (not shown) and is accessed by the processor 134 when necessary.

In some embodiments, a library of quality equations can be stored in the memory 136 and can be accessed by the processor 134 when calculating media-quality-value(s). The appropriate equation can be selected based on filter criteria and/or threshold conditions that are stored in the memory 136. For example, the processor 134 can be configured to access a particular quality equation based on a particular parameter value exceeding a specified threshold value. In other embodiments, the processor 134 can be configured to access and calculate multiple media-quality-values for a given set of extracted parameter values using multiple quality equations. The quality equation (s) can, in some embodiments, be implemented in a hardware solution such as firmware that can be located within the processor 134 or located in or as a separate module that can be accessed by the processor 134.

Although this embodiment shows that the media monitoring device 130 is connected (e.g., via an out-of-band connection or over the IP data network 120) to switches 102 and 104 that are located at the borders of the IP data network 120, in some embodiments the media monitoring device 130 can be connected to switches located at different locations within the IP data network 120. For example, the media monitoring device 130 can be connected to access points and/or other devices interior to the IP data network 120 so that the media monitoring device 130 can obtain a parameter value(s) and calculate a media-quality-value(s), for example, associated with one or more segments and/or links within the IP data network 120.

In several variations, the media monitoring device 130 can be configured to send one or more parameter values to a remote device (not shown) for further processing and calculation using a quality equation. In some embodiments, the media monitoring device 130 can store parameter values for later use in the quality equation to calculate a media-quality-value. For example, the media monitoring device 130 can store parameter values and later calculate media-quality-values corresponding to averages of parameter values collected, for example, during discrete periods of time.

After a media-quality-value(s) has been calculated by the processor 134, the media monitoring device 130 can make the media-quality-value(s) available to a user to access via a user interface 160. In some embodiments, the user interface 160 can be configured so that a user can control the media monitoring device 130 by prompting the media monitoring device 130 to obtain one or more parameter values and calculate one or more media-quality-values on-demand. The user interface 160 can also be configured as an interface that a user can use to program the media monitoring device 130 and/or upload one or more quality equations.

In some embodiments, multiple simultaneous media signals transmitted over an IP data network can be monitored and media-quality-values for each media signal can be concurrently calculated. In some embodiments, dynamic QoS monitoring can be executed using a quality equation. For example, media-quality-values can be calculated periodically (e.g., every 10 seconds) and the trends can be tracked so that degradation in media signal quality can be detected. In several embodiments, media-quality-values can be calculated with reference to a threshold value and an alarm indicator can be sent to, for example, a network administrator if a calculated media-quality-value, for example, exceeds the threshold value. In some embodiments, media-quality-values can be used to detect, for example, a denial of service (DoS) attack based on, for example, RTP flooding. RTP flooding, which introduces significant jitter and packet loss in an IP data network, can be detected based on a calculated media-quality-value falling below, for example, a defined threshold value or reference media-quality-value.

In some embodiments, more than one media monitoring device 130 can be used to calculate a media-quality-value for a media signal being transmitted over an IP data network 120. For example, a first media monitoring device can be connected to a first access point (e.g., switch) and a second media monitoring device can be connected to a second access point (e.g., switch). The first media monitoring device and second media monitoring devices can be configured to obtain parameter values associated with IP packets via their respective access points. The first media monitoring device and second monitoring device can share (e.g., send and/or receive) their parameter values so that each media monitoring device can independently calculate media-quality-values, if necessary.

Figure 2:
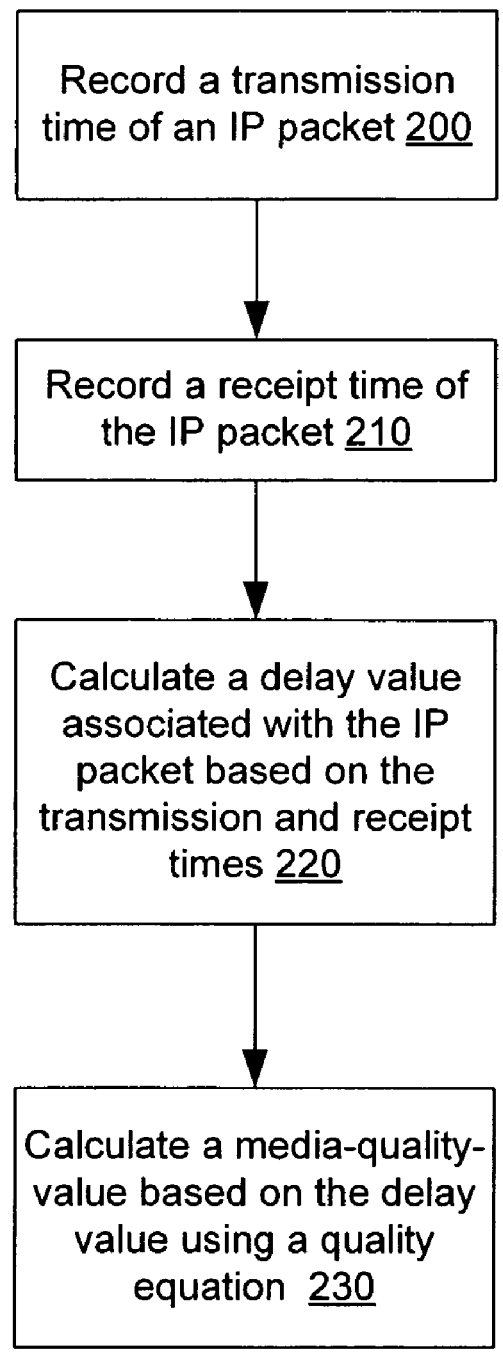
FIG. 2 illustrates a method for calculating a media-quality-value using a delay value obtained by monitoring an IP packet, according to an embodiment of the invention.

Referring now to FIG. 2, this figure illustrates a method for calculating a media-quality-value using a delay value obtained by monitoring an IP packet (e.g., an IP packet containing video content). The delay value in this embodiment corresponds to the time for the IP packet to be transmitted over a defined portion of an IP data network. The figure shows that a transmission time of an IP packet is first recorded at 200. The transmission time corresponds to the time that the IP packet is transmitted into a defined portion of an IP data network and can be obtained via, for example, an access point. A receipt time of the IP packet is then recorded at 210. The receipt time of the IP packet corresponds to the time that the IP packet exits the defined portion of the IP data network. The receipt time can be obtained via, for example, an access point.

When the transmission and receipt times are recorded at 200 and 210, respectively, a tag is associated with the transmission and receipt times based on the IP packet so that the transmission time, receipt time, and IP packet can be properly associated with one another for further processing. For example, a unique identifier associated with and/or assigned to the IP packet, such as the sequence number within the header of the IP packet, can be associated with the transmission and receipt times when they are recorded.

After the transmission and receipt times associated with the IP packet are obtained, a delay value can be calculated based on the transmission and receipt times at 220. The delay value is the difference between the receipt time and the transmission time and can be calculated using, for example, a processor within a media monitoring device. The transmission and receipt times are associated with the IP packet and with each other using the unique identifier recorded with the transmission time, receipt time, and or IP packet.

Using the calculated delay value, a media-quality-value can be calculated using a quality equation at 230. The quality equation can be based on a delay parameter and can be configured so that the media-quality-value calculated using the quality equation corresponds to a subjective quality rating of the media signal being transmitted using the IP packet.

In some embodiments, rather than calculating a delay value, other parameter values such as, for example, packet loss can be calculated by monitoring IP packets as they are transmitted over a portion and/or over an entire IP data network. For example, if calculating packet loss, a media monitoring device can record the sequence numbers of IP packets as they are transmitted into an IP data network and record the sequence numbers of IP packet as they exit the IP data network. A count of the number of packets that enter, but do not exit the IP data network, as determined using the recorded sequence numbers, can be used to calculate a packet loss parameter value.

In several embodiments, rather than calculating parameter values by monitoring IP packets as they are being transmitted over an IP data network, a parameter value(s) can be obtained by extracting parameter values directly from IP packets. For example, parameter values such as a jitter value can be collected from an IP packet if the jitter value can be contained in, for example, the header of the IP packet. The parameter values extracted from IP packets can, like the calculated parameter values, be used to calculate a media-quality-value using a quality equation.

Figure 3:
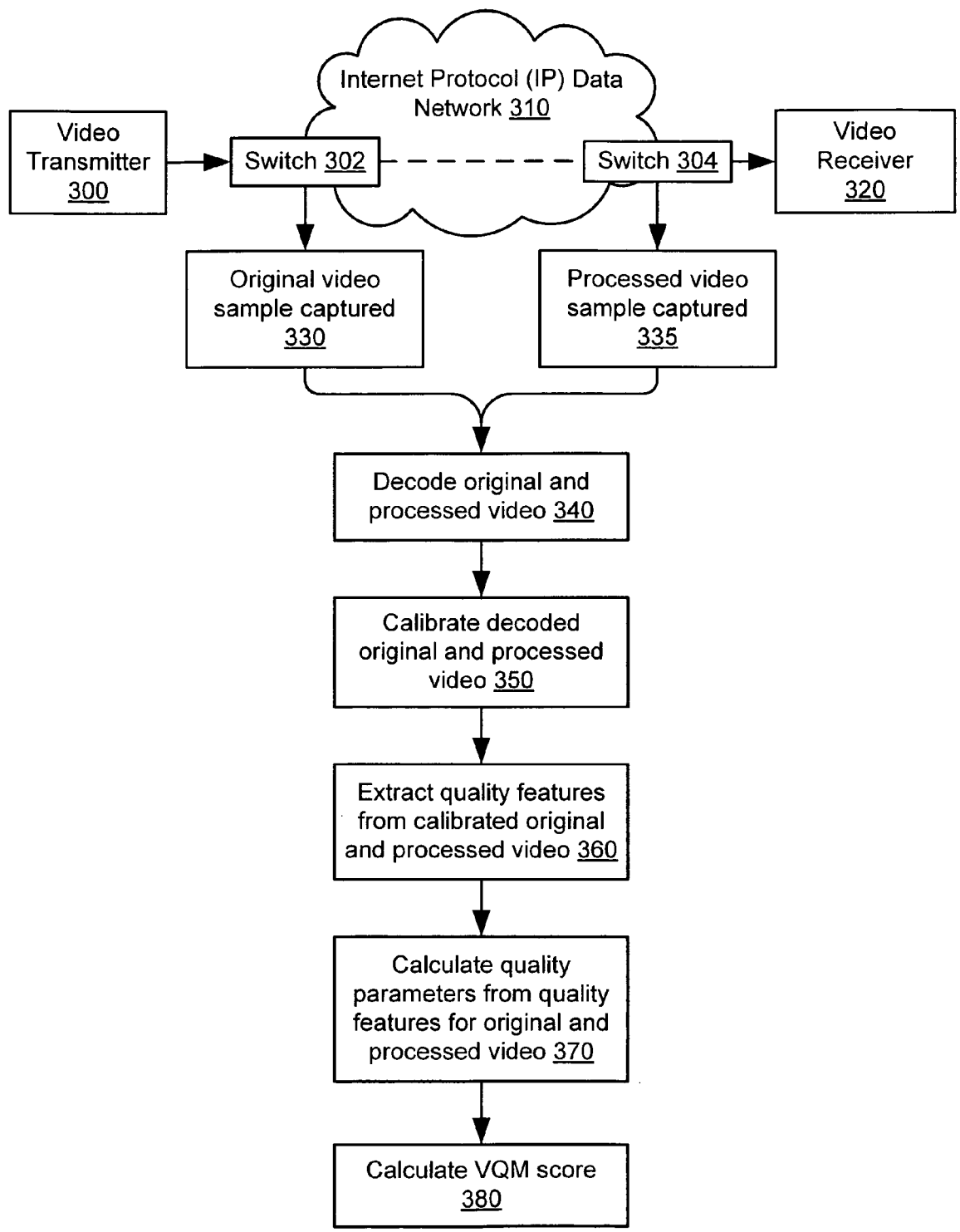
FIG. 3 illustrates a known method for computing a Video Quality Metric (VQM) score for a video signal transmitted from a video transmitter to a video receiver over an internet protocol (IP) data network, according to an embodiment of the invention.
Figure 4:
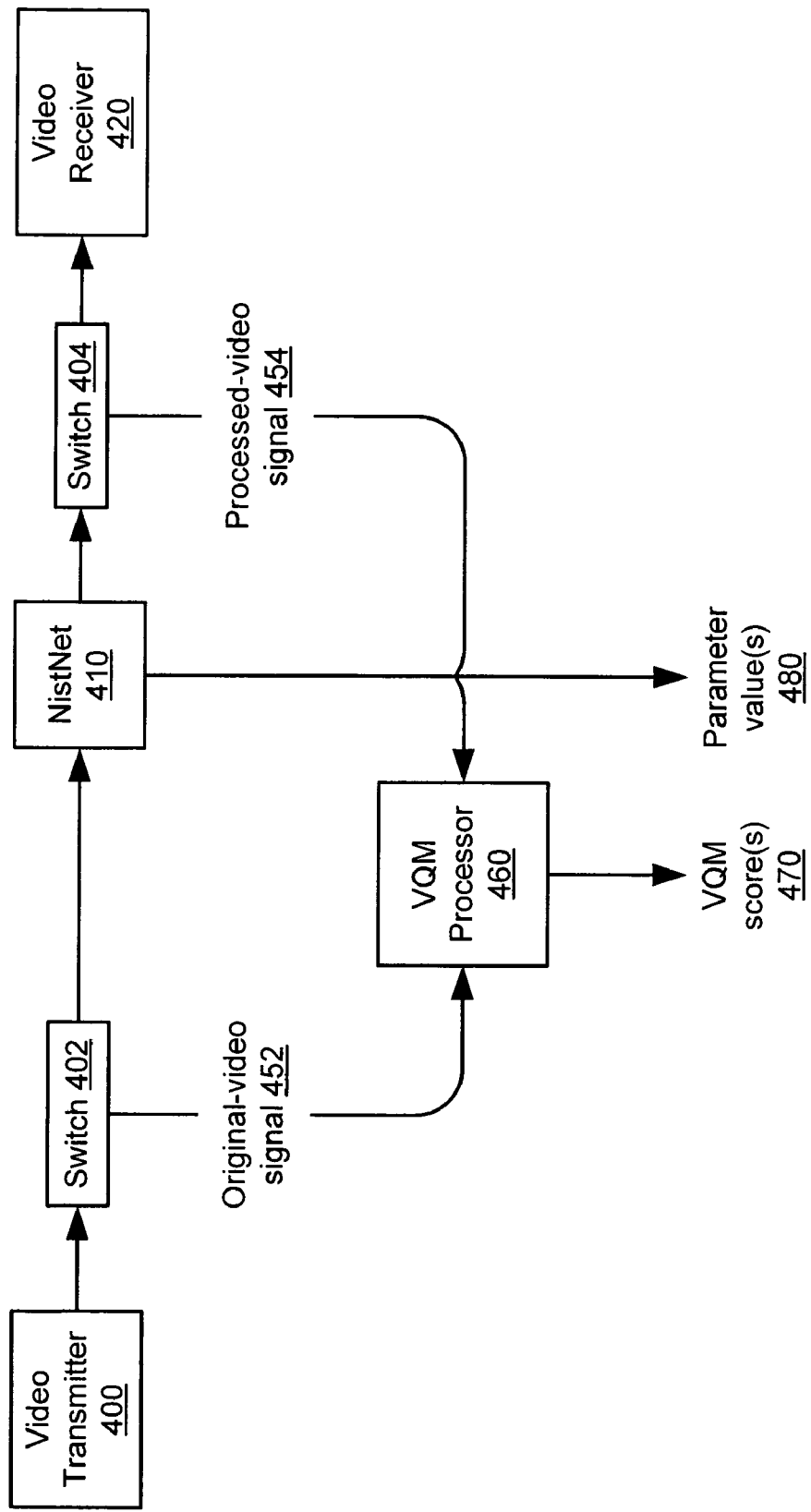
FIG. 4 shows an equipment configuration that can be used to generate a set of VQM scores that corresponds to defined parameter value ranges, according to an embodiment of the invention.
Figure 5:
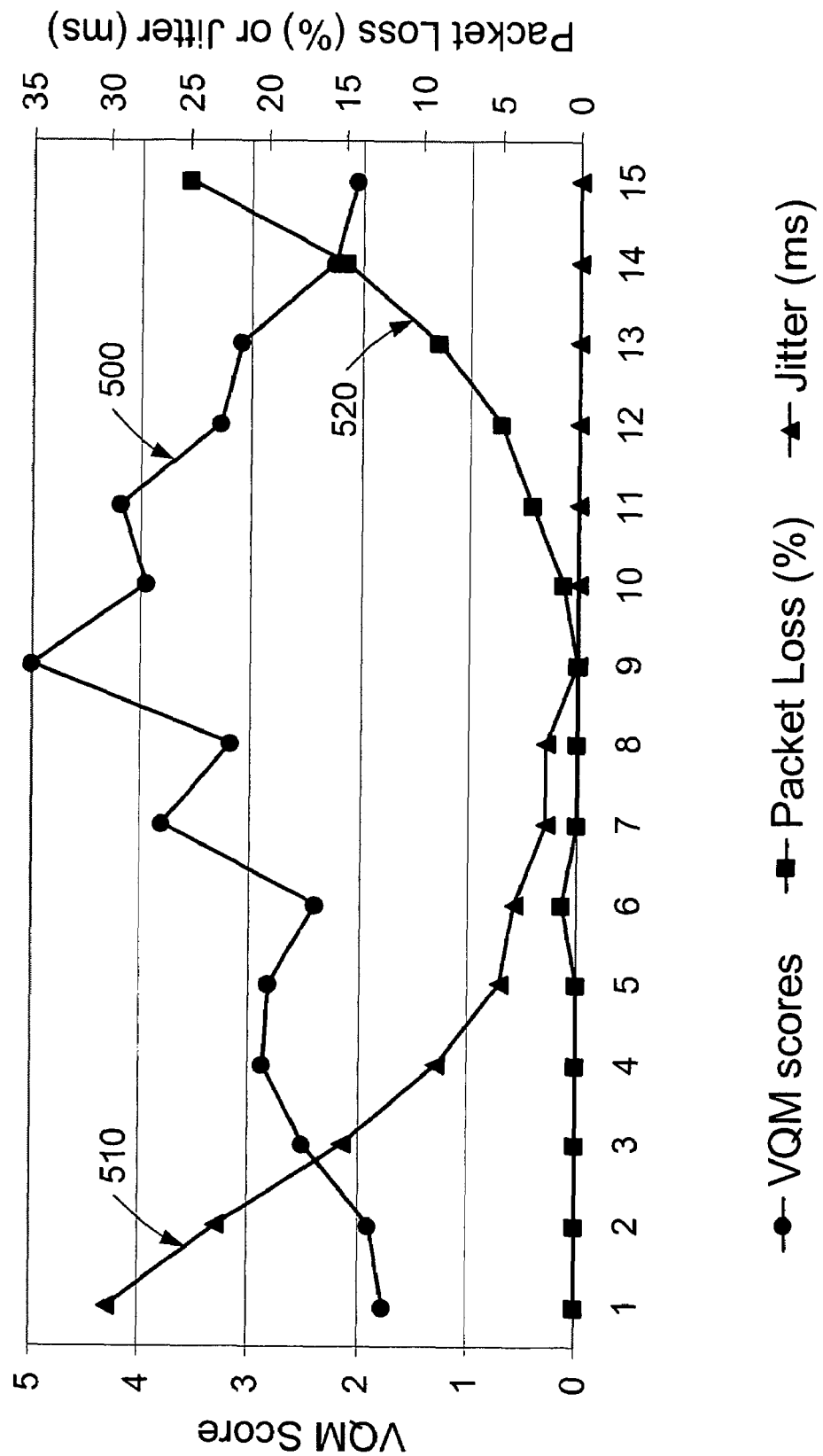
FIG. 5 is a graph that illustrates VQM scores with corresponding jitter values and packet loss values, according to an embodiment of the invention.
Figure 6:
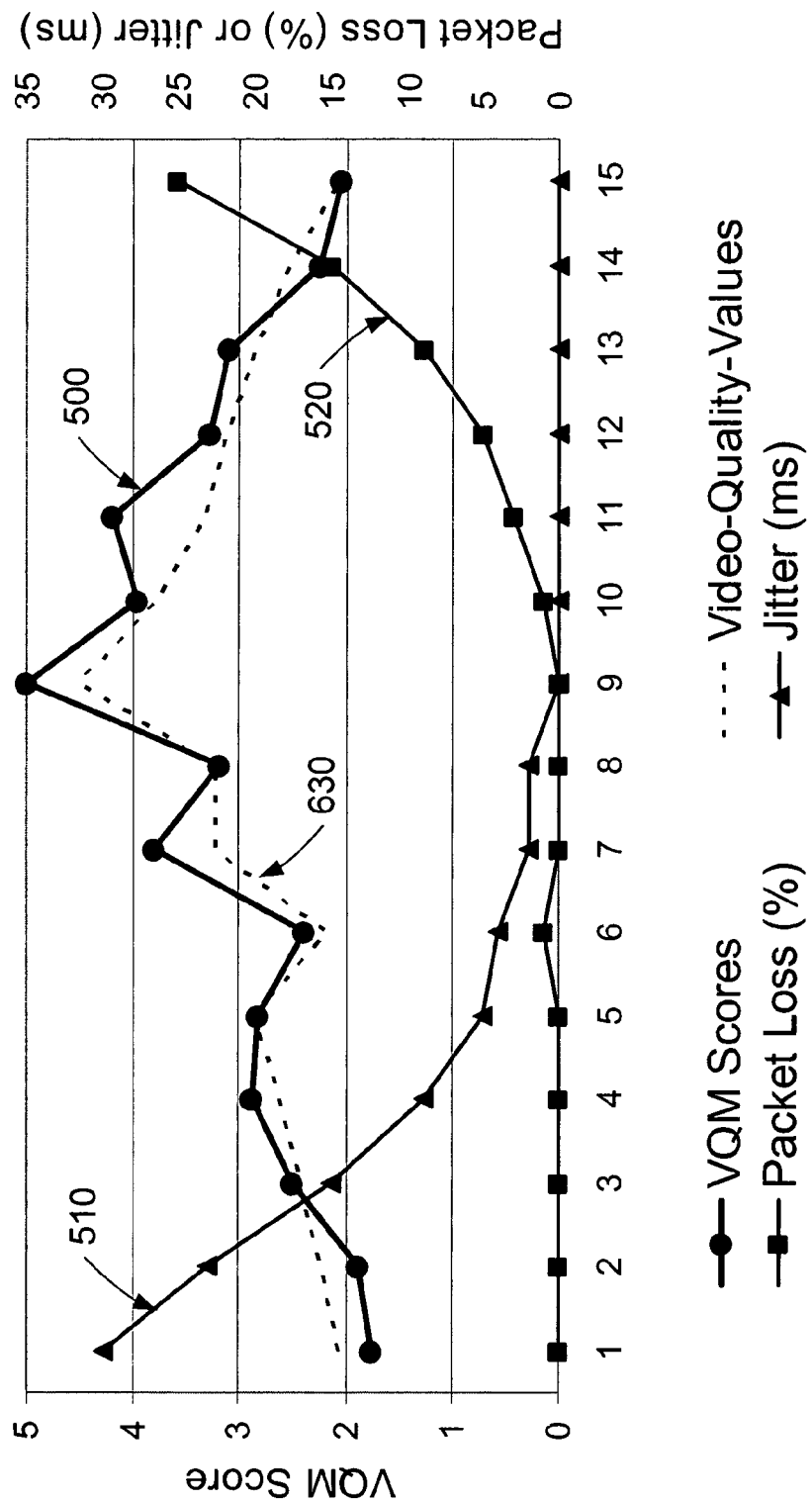
FIG. 6 is a graph that shows the correlation between the VQM scores and media-quality-values as calculated using a video quality equation, according to an embodiment of the invention.

The fitting of a video quality equation to a set of VQM scores so that the media-quality-value substantially corresponds to a VQM score for a given parameter value(s) is described in detail with reference to FIGS. 3-6. FIG. 3 shows a known method for computing a VQM score for a video signal and FIG. 4 shows an equipment configuration that can be used to generate VQM scores (using the known method described in FIG. 3) that correspond to defined parameter value ranges. FIG. 5 is a graph that shows VQM scores and corresponding parameter values generated using the equipment configuration shown in FIG. 4. Finally, a video quality equation derived using the data shown in FIG. 5 is described and calculations using the video quality equation are shown in FIG. 6.

Although the embodiment described in FIGS. 3-6 is focused on the calculation of a media-quality-value using a video quality equation related to a video signal transmitted over an IP data network, a person skilled in the art can appreciate that the techniques described herein can be used to calculate media-quality-values based on quality equations that are derived using any kind of subjective quality rating and related to any combination of media signals such as an audio signal alone and/or a combination video and audio signals.

Referring now to FIG. 3, it shows a known method for computing a VQM score (referred to herein as the "VQM method") for a video signal transmitted from a video transmitter 300 to a video receiver 320 over an internet protocol (IP) data network 310. The VQM score was developed by the National Telecommunications and Information Administration (NTIA) and endorsed by the International Telecommunications Union (ITU) in recommendation ITU-T.J144. The VQM score is a standardized video quality measurement that is an indicator of a subjective quality rating/measurement of video content as determined by a human viewer. The VQM method for deriving a VQM score, although computationally expensive, has been recognized as a reliable objective method to determine video quality.

Using the VQM method, a sample of a video signal before processing (can also be referred to as original-video) and a sample of video after processing (can also be referred to as processed-video) are compared to obtain a VQM score that corresponds to the level of video degradation caused by processing. Processing includes, but is not limited to, transmission over an IP data network, encoding, synchronization, and/or decoding, etc.

Referring back to the example shown in FIG. 3, an original-video sample is captured 330 at switch 302 from a video signal transmitted by video transmitter 300. A processed-video sample is captured 335 at switch 304 before the video signal is received by the video receiver 320. Switches 302 and 304 are access points into the IP data network 310. Because the video signal is being transmitted over an IP data network 310, the original-video sample and processed-video sample are collections of IP packets with payloads that contain video content that make up the video signal.

After the original-video and processed-video samples are captured at 330 and 335, respectively, the original-video and processed-video are separately decoded at 340. The decoding can include, for example, decompressing the contents of IP packets that make up the samples. The decoded original-video and decoded processed-video are then each calibrated at 350, for example, to compensate for horizontal and vertical image shifts, temporal shifts of the video samples that can result from non-zero video delays, and/or changes in image contrast and/or brightness.

After the video samples have each been calibrated at 350, the quality features are extracted from the calibrated original-video and calibrated processed-video samples at 360. The quality features, for example, characterize perceptual changes in the chrominance, temporal features, and/or spatial features of the calibrated original-video and calibrated processed-video samples. The quality features for the calibrated original-video and processed-video samples, respectively, are then used to calculate quality parameters at 370 for the qualities features associated with the original-video and processed-video samples, respectively. The quality parameters indicate, for example, the distortion in video quality due to gains and losses in the quality features.

Finally, a VQM score is calculated at 380 using the combination of the quality parameters that are associated with the original-video and processed-video samples, respectively. The VQM score is a score on a scale of 1 to 5 that indicates perceptual impairments that can be detected by a human viewer such as blurring, block distortion, jerky/unnatural motion and/or noise that result from the processing of the original video signal. A high VQM score (e.g., 4.9) indicates that the subjective quality of a processed-video sample is close to the subjective quality of a sample of original-video. Likewise, a low VQM score (e.g., 1.2) indicates that the subjective quality of a sample of original-video has degraded significantly as a result of processing. The steps of the VQM method, steps 335 through 380, can be performed using, for example, a VQM processor (not shown).

The schematic diagram in FIG. 4 shows a video transmitter 400 transmitting a video signal using video IP packets to a video receiver 420 via switch 402, NetNist 410, and switch 404, according to an embodiment of the invention. The NetNist 410 is configured to introduce predetermined amounts of variation (also can be referred to as impairments) such as delay, jitter, and packet loss into the video signal produced by the video transmitter 400 to degrade the video signal. An original-video signal 452 (before the predetermined variation is introduced by the NistNet 410) and processed-video signal 454 (after the predetermined variation is introduced by the NistNet 410) are processed by a VQM processor 470 using the VQM method to generate a VQM score that indicates the level of degradation caused by the predetermined variation introduced by the NistNet 410. The original-video signal 452 and processed-video signal 454 are collected via switches 402 and 404, respectively.

Because the NetNist 410 is configured to introduce precise impairments that correspond to parameter value(s) 480, using this equipment configuration, specified precise impairments such as jitter can be introduced by the NistNet 410 and corresponding VQM scores recorded. For example, the NetNist 410 can, for example, introduce 5 ms of jitter or a packet loss of 10 percent and corresponding VQM scores resulting from these impairments can be recorded. This technique was used to generate the data shown in FIG. 5 described below.

FIG. 5 is a graph that illustrates VQM scores (curve 500) with corresponding jitter values (curve 510) and packet loss values (curve 520) produced using an equipment configuration like that shown in FIG. 4. The y-axis shows VQM scores 510 on a scale from 1 to 5 and the secondary y-axis shows packet loss values in percent (%) 520 or jitter values in milliseconds (ms) 510 depending on the curve being followed. If following the packet loss curve 520, the secondary y-axis is packet loss in percentage, but if following the jitter curve 510, the secondary y-axis is jitter in milliseconds.

FIG. 5, on the x-axis, shows VQM scores that result from 15 sets of predetermined combinations of jitter values and packet loss percentages numbered 1 through 15. The packet loss values 520 vary from 0% to 25% and the jitter values 510 vary from 0 ms to 30 ms. These ranges of packet loss values and jitter values are representative of the ranges of variation that can be detected in an IP data network. For example, combination no. 6 in the graph shows that introducing a packet loss of 1% and a jitter of 4 ms results in a VQM score of 2.4. The values in this graph were produced with a video signal that was encoded using an H.263 codec and transmitted at a bandwidth of 384 kilobits/second.

Using VQM scores, jitter values, and packet loss values like those illustrated in FIG. 5 and using regression analysis, the constants and parameters that make up the quality equation (equation 2) shown below was derived:

$$MQM = 1.215 - 0.043*PL + 1.42(1+PL) - 0.021*J + 1.869/(1+J) \quad (2)$$

where PL is packet loss, J is jitter, and MQM is media-quality-value. In some embodiments, the constants and/or parameters in a quality equation can be adjusted to fit the equation with a certain level of tolerance to a specified range of, for example, jitter values. Terms (i.e., combinations of constants and/or parameters) within the quality equation can be added, subtracted, and/or adjusted, for example, to achieve specified levels of precision and/or to simplify the quality equation.

FIG. 6 is a graph that shows the correlation between the VQM scores from FIG. 5 and media-quality-values as calculated using the quality equation above (equation 2) and using the parameter values from FIG. 5. Reference numerals identical to those in FIG. 5 are used FIG. 6 to show the VQM scores (curve 500), jitter values (curve 510), and packet loss values (curve 520) that were illustrated in FIG. 5. FIG. 6 also includes media-quality-values (curve 630) that were calculated using equation 2, jitter values 510, and packet loss values 520. As a person skilled in the art can appreciate based on the values depicted in the graph, the correlation between the VQM scores 500 and the media-quality-values 630 calculated using the quality equation is high. A statistical analysis of the correlation between the VQM scores and the media-quality-values established that the correlation is approximately 0.93 (r-squared value) and the root means square (RMS) error is approximately 3%.

In some embodiments, a quality equation can be derived that is a function of any combination of parameters such as packet loss, jitter, delay, codec type, bandwidth, video scene type, etc. using techniques such as that described in FIGS. 3-6. For example, in several embodiments, a quality equation that is a function of packet loss can be derived for each codec type within a set of defined codecs. A media-quality-value, for example, can be calculated based on an appropriate quality equation that is selected based on a specific codec type being used in a particular application. Equations 3 and 4 shown below are example quality equations that are based on the H.263 and H.264 codecs, respectively:

$$MQM = 1.215 - 0.043*PL + 1.42/(1+PL) \quad (3)$$

$$MQM = 1.94 - 0.163*PL + 2.97*e^{-PL} \quad (4)$$

where MQM is media-quality-value and PL is packet loss. Also, in some embodiments a quality equation can be adjusted to account for jitter buffer, packet reordering, and/or play out algorithms by including additional parameters and/or constants in the quality equation.

In some embodiments, a quality equation can be expanded to include other terms and/or parameters so that a media-quality-value can be calculated that corresponds to a subjective measure of more than just a video signal. For example, in some embodiments a mean opinion score (MOS) for an audio signal that corresponds to a video signal can be included in a quality equation. The media-quality-value can be a subjective score for, for example, a video conference call that includes a video signal and an audio signal. A media-quality-value that reflects the quality of a combined video signal and audio signal can be referred to as a video call quality metric (VCQM). A quality equation that can be used to calculation a VCQM can be referred to as a overall quality equation. An example of the form of an overall quality equation that can be used to calculate a media-quality-value that can be a measure of the subjective quality of a combined video signal and audio signal is shown below as equation 5:

$$MQM = f(\text{network delay}, \text{audio MOS}) \quad (5)$$

where MQM is media-quality-value and is a function of network delay and an audio mean opinion score (audio MOS). Audio MOS can be calculated, for example, using a standard E-Model for computing an MOS score related to an audio signal. In some embodiments, parameters such as, for example, jitter and/or multi-media synchronization offset (MMS) can be included in an overall quality equation. MMS can be calculated using, for example, the inter-media time difference between a video signal and an audio signal (e.g., time offset between what are supposed to be synchronized audio and video signals).

In some embodiments, portions of an overall quality equation such as the portions related to a video signal can be fitted to VQM score values while other portions of the overall quality equation such as portion related to an audio signal can be fitted to audio models such as the E-model. The overall quality equation can be based on a 1 to 5 scale like the VQM score or can be based on a different scale.

CONCLUSION

In conclusion, an apparatus and method for measuring a media-quality-value using a quality equation based on one or more IP packet parameter values has been described. While various embodiments of the invention have been described above, it should be understood that they have been presented by way of example only, and not limitation. Thus, the breadth and scope of the invention should not be limited by any of the above-described embodiments. While the invention has been particularly shown and described with reference to specific embodiments thereof, it will be understood that various changes in form and details may be made. For example, the techniques described herein can be applied to a variety of network communication protocols in addition to internet protocol (IP).

What is claimed is:

1. A method, comprising:
    receiving a video signal value associated with at least one parameter associated with a first internet protocol (IP) packet including encoded video content, the video signal value being based on data extracted from a header associated with the first IP packet;
    receiving an audio signal value associated with a second IP packet including encoded audio content; and
    automatically calculating, using a processor, a media-quality-value based on the received video signal value, on a video quality equation, and on the received audio signal value, the calculating being performed without decoding the encoded audio and video contents, the video quality equation including the at least one parameter and at least one constant, the at least one parameter and the at least one constant are defined so that the media-quality-value calculated based on the video quality equation substantially correlates with a subjective quality measurement, the at least one parameter including a bandwidth parameter.

2. The method of claim 1, further comprising associating the media-quality-value with a plurality of IP packets, the first IP packet is from the plurality of IP packets, each IP packet within the plurality of IP packets includes encoded video content.

3. The method of claim 1, wherein the first IP packet is from a plurality of IP packets, each IP packet within the plurality of IP packets includes encoded video content, the at least one parameter includes a packet loss value that is calculated based on the plurality of IP packets.

4. The method of claim 1, wherein the at least one parameter further includes at least one of a jitter parameter or a delay parameter.

5. The method of claim 1, further comprising selecting the video quality equation from a set of video quality equations based on a codec type.

6. The method of claim 1, wherein the first IP packet is transmitted over an IP data network, the calculating is substantially at the same time that the first IP packet is transmitted.

7. The method of claim 1, further comprising detecting a quality of service attack based on a difference between the calculated media-quality-value and a reference media-quality-value.

8. The method of claim 1, wherein the audio signal value is an audio quality equation, the audio quality equation is based on a parameter associated with the second IP packet.

9. The method of claim 1, wherein the audio quality equation is based on an E-model.

10. The method of claim 1, wherein the subjective quality measurement is a Video Quality Metric (VQM) score.

11. A method, comprising:
    extracting header data from a header associated with an internet protocol (IP) packet including encoded video content and encoded audio content, and determining a value of a parameter based on the extracted header data;
    defining, as components of a quality equation, the value of the parameter based on the extracted header data and a value of a constant based on at least one subjective quality measurement value;
    automatically calculating, using a processor, a media-quality-value related to a combined video signal and audio signal based on the quality equation, on the value of the parameter based on the extracted header data, and on an audio signal value associated with an audio component of the combined video signal and audio signal, the calculating being performed without decoding the encoded audio and video contents, at least part of the combined video signal and audio signal is transmitted over an IP data network via the IP packet; and
    detecting a denial of service attack based on a difference between the calculated media-quality-value and a reference media-quality-value.

12. The method of claim 11, wherein the extracting of header data from the header comprises extracting the value of the parameter from the header associated with the IP packet.

13. The method of claim 11, further comprising calculating the value of the parameter based on a data associated with the IP packet, the value is captured via an access point.

14. The method of claim 11, wherein the audio signal value is an audio quality equation.

15. An apparatus, comprising:
a memory configured to store a video quality equation including at least one parameter and at least one constant, the at least one parameter and the at least one constant are defined so that a media-quality-value calculated based on the video quality equation substantially correlates with a subjective quality measurement, the at least one parameter including a bandwidth parameter; and
a processor configured to access the memory and configured to calculate the media-quality-value based on:
a value of the at least one parameter associated with a first internet protocol (IP) packet, the first IP packet includes encoded video content, the value of the at least one parameter based on data extracted from a header of the first IP packet;
the video quality equation; and
an audio signal value associated with a second IP packet including encoded audio content, the calculation to be performed without decoding the encoded audio and video contents.

16. The apparatus of claim 15, wherein the first IP packet is from a plurality of IP packets, each IP packet within the plurality of IP packets includes encoded video content, the media-quality-value is associated with the plurality of IP packets.

17. The apparatus of claim 15, wherein the at least one parameter further includes at least one of a jitter parameter or delay parameter.

18. The apparatus of claim 15, wherein the first IP packet is transmitted over an IP data network, the processor is configured to calculate the media-quality-value at substantially the same time that the first IP packet is transmitted.

19. The apparatus of claim 15, wherein the processor is further configured to detect a quality of service attack based on a difference between the calculated media-quality-value and a reference media-quality-value.

20. The apparatus of claim 15, wherein the subjective quality measurement is a Video Quality Metric (VQM) score.

21. The method of claim 1, wherein the audio signal value is an inter media time difference calculated based on the first IP packet and the second IP packet.

22. The method of claim 11, wherein the audio signal value is an inter media time difference between an audio signal a video signal comprising the combined video signal and audio signal.

23. The apparatus of claim 15, wherein the audio signal value is an inter media time difference calculated based on the first IP packet and the second IP packet.

24. The apparatus of claim 15, wherein the audio signal value is an audio quality equation.

25. The method of claim 1, wherein the video signal value is a jitter value extracted from the header associated with the first IP packet.

26. The method of claim 1, wherein the video signal value is a delay value calculated based on transmission and receipt times associated with a unique identifier extracted from the header associated with the first IP packet.

27. The method of claim 12, wherein the value of the parameter is a jitter value extracted from the IP packet header.

28. The method of claim 11, wherein the extracting of data comprises extracting a unique identifier from the IP packet header, the determining of the value of the parameter comprising calculating a delay value based on transmission and receipt times associated with the unique identifier.

29. The apparatus of claim 15, wherein the value of the at least one parameter includes a jitter value extracted from the header of the first IP packet.

\* \* \* \* \*

UNITED STATES PATENT AND TRADEMARK OFFICE
CERTIFICATE OF CORRECTION

PATENT NO. : 7,965,650 B2
APPLICATION NO. : 11/436195
DATED : June 21, 2011
INVENTOR(S) : Joonbum Byun et al.

Page 1 of 1

It is certified that error appears in the above-identified patent and that said Letters Patent is hereby corrected as shown below:

IN THE CLAIMS:

In column 12, line 13, in Claim 22, delete "a" and insert -- and a --, therefor.

Signed and Sealed this
Fifteenth Day of May, 2012

David J. Kappos
*Director of the United States Patent and Trademark Office*